United States Patent
Graf

(10) Patent No.: US 8,060,528 B2
(45) Date of Patent: *Nov. 15, 2011

(54) BUSINESS INTELLIGENCE OLAP CONSUMER MODEL AND API

(75) Inventor: Arnd Peter Graf, Romerberg (DE)

(73) Assignee: SAP AG, Walldorf (DE)

( * ) Notice: Subject to any disclaimer, the term of this patent is extended or adjusted under 35 U.S.C. 154(b) by 1558 days.

This patent is subject to a terminal disclaimer.

(21) Appl. No.: 11/192,938

(22) Filed: Jul. 29, 2005

(65) Prior Publication Data

US 2007/0027876 A1 Feb. 1, 2007

(51) Int. Cl.
*G06F 7/00* (2006.01)
*G06F 17/30* (2006.01)

(52) U.S. Cl. ........................ 707/770; 707/803

(58) Field of Classification Search ............... 707/1–10, 707/100–104.1, 200–206
See application file for complete search history.

(56) References Cited

U.S. PATENT DOCUMENTS 5,341,476 A * 8/1994 Lowell .......................... 709/219
5,717,925 A * 2/1998 Harper et al. .................. 707/102

OTHER PUBLICATIONS

JOLAP Specificaiton (2003), pp. 19, 26 and 27.*
"XML for Analysis Specification", Version 1.0, Microsoft Corporation, Hyperion Solutions Corporation, Updated: Apr. 24, 2001. 107 pages.
"JOLAP Specification: Proposed Final Draft", Version 1.0, Java™ 2 Enterprise Edition, Java™ OLAP Interface (JOLAP), Aug. 30, 2003, 263 pages.

* cited by examiner

*Primary Examiner* — Jean B Fleurantin
(74) *Attorney, Agent, or Firm* — Buckley, Maschoff & Talwalkar LLC

(57) ABSTRACT

According to some embodiments, a method is provided including receiving, from a front-end portion of a business information system, a data request at a back-end portion of the business information system, identifying an information provider associated with the data request, passing the data request to the information provider via a consumer services interface using a selection object and a query view object, and receiving a result set from the information provider.

18 Claims, 5 Drawing Sheets

BUSINESS INTELLIGENCE OLAP CONSUMER MODEL AND API

FIELD

Some embodiments of the present invention relate to business information systems. In particular, some embodiments relate to business information systems that access data from different sources.

BACKGROUND

A business information system can improve an organization's ability to monitor and manage data in a complex business environment. A business information system, such as the SAP Business Intelligence ("BI") systems offered by SAP AG of Walldorf Germany, provides components and tools that allow users to retrieve, view and manipulate data from a number of different sources. Some items of data may be from internal sources (e.g., such as a company's internal database), while others may be from external or third party sources. As used herein, a company's "internal data" is data that is stored and maintained as part of the company's overall business intelligence solution. Some of the data, for example, may be associated with a "data warehouse" (generally referred to herein as a "business warehouse" or "BW"). The BW may be a combination of business information stored in a variety of ways, including in relational database, in memory databases, in data storage areas remote from the enterprise application systems and in virtual data sources (such as ad hoc data generated from business coding in the BW). As used herein, "external data" is data that is not processed or maintained by the analytical engine of the business information system.

A BW may include preconfigured data formats and conventions. As a result, it is relatively straightforward to query, view and manipulate "internal data" (or data from the BW). It can be more difficult, however, for a business information enterprise system to process requests, queries, or other interactions with external data or data from external data sources or other applications. For example, external data is typically formatted or configured differently from the internal data. One example of a type of transaction which is made more difficult by the need to access both internal and external data is the execution of a query to retrieve specified data. Business information enterprise systems typically provide some capability for users of the system to submit a query to retrieve and view data.

A "query view" is a definition of desired data, including a definition of what data to look for and how to arrange and format the data. The query view represents all of the settings an end user client application requires to provide the data to the end user. For example, a query view typically includes restrictions (or filters) that are applied to the data to be accessed. Specific illustrative examples are: product lines, company names, customer groups, fiscal year, distribution regions, product costs, product quantities, revenues, dates, etc. Data filters may be applied to further limit the result data. For example, result data can be filtered to identify illustrative features such as: the customers having revenue greater than 1 million dollars, the top 10 customers according to revenue, the customers having actual derivation to plan of greater 5%, etc. Query views may further include visualization settings to more efficiently display and format retrieved data. For example, visualization settings may include traffic light reporting or calculations based on the retrieved data (like ranking calculations) or the like. By providing such settings, the retrieval of data becomes more efficient and focused to a user's particular needs.

In existing systems, a query is generally executed by a query application (the "called application") which is called by another application (the "calling application") that will analyze the retrieved query data and add client applications on top of the retrieved query data. The query view is generally defined in a format native to the calling application rather than to the called application. As such, the calling application must include a translator to convert the query view into a format native to the called application. However, such an approach can become cumbersome, particularly when there are several different applications in a business information system that include query views, since each application has to have its own translator. In this case, a developer must know how to translate query views from each application's format to the format of the called application and then create all the translators. This is costly and time-consuming.

Some systems use Microsoft® XMLA for data retrieval. However XMLA/MDX only describes the data retrieval part in a structured query language (SQL)-like manner. Therefore calling applications typically have their own model on top of it and generate XMLA/MDX for data access based on their model. The generation of XMLA/MDX is quite complicated, because XMLA/MDX is generic and geared toward academia and many business questions result in very complex MDX code (where MDX is the query language of XMLA/ODBO). Concepts like traffic light reporting, currency translation, complex currency and unit handling or inactive parts of the definition are missing completely. These features have to be enhanced (if possible) by the calling application.

Other systems use JOlap, a Java based online analytical processing (OLAP) API that provides an OLAP model that is powerful and complex. Again, the API only treats the data retrival itself and it is difficult and time-consuming to translate the query views from an application's format to the API.

Other existing APIs do not provide concepts such as traffic light reporting (exception calculation) and list calculation, and therefore put this load on the calling applications, reducing the accuracy and effectiveness of the API in a business information system.

It would be desirable to provide improved methods and systems for executing query views and for otherwise allowing interaction between calling applications and called applications, including situations where the called applications are external applications or include external data, without putting the translation and enrichment efforts on the calling application.

DETAILED DESCRIPTION

Figure 1:
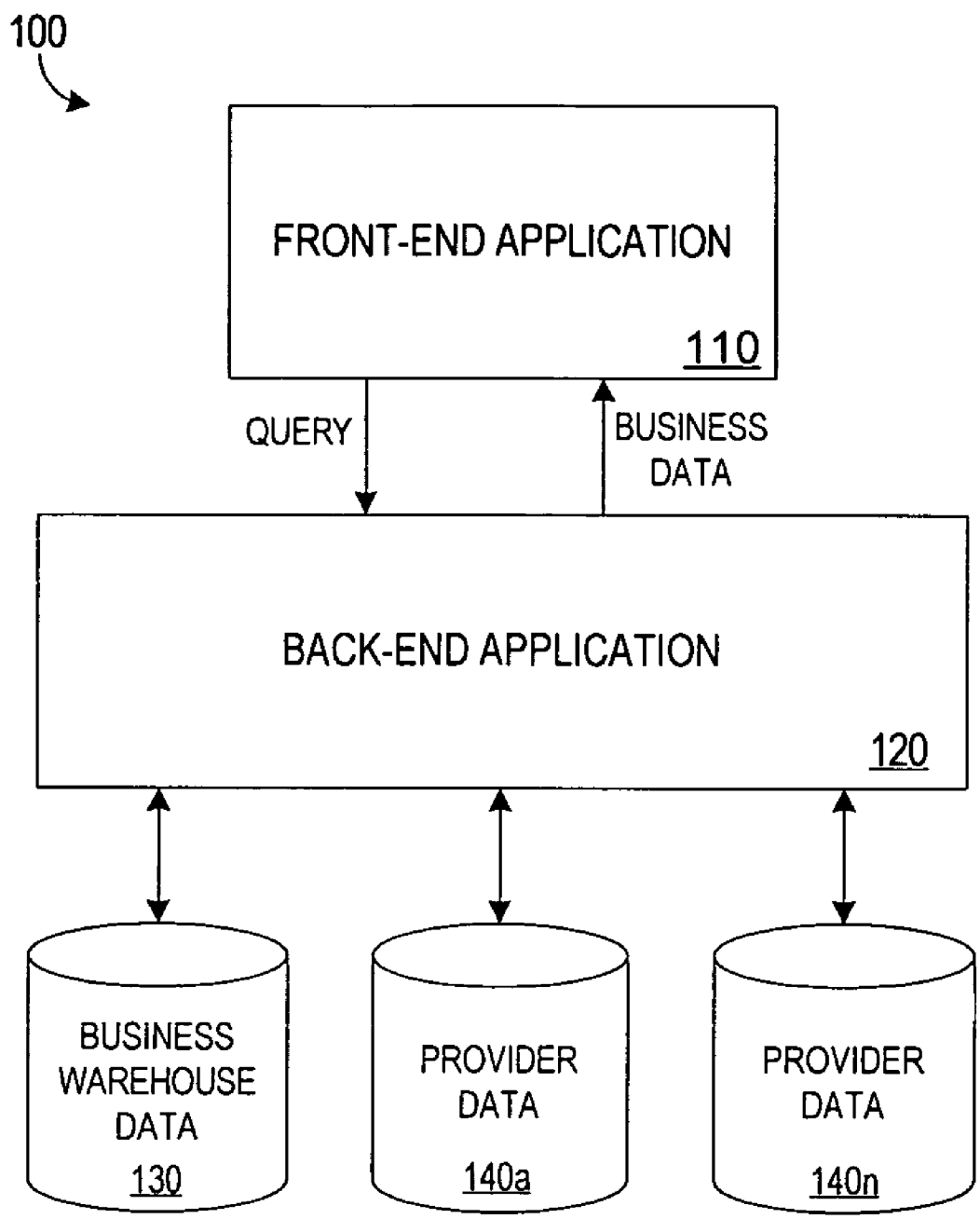
FIG. 1 is an information flow diagram pursuant to some embodiments.

To alleviate problems inherent in the prior art, some embodiments of the present invention introduce systems, methods, computer program code and means to facilitate operation of a business information system to access different types of data, including internal data (or data formatted in a manner known to the system) and external data (or data from data providers that may use different formats).

For convenience and ease of exposition, a number of terms are used herein to illustrate features of embodiments of the present invention. For example, the term "meta data" is used to refer to data used to describe the contents of a data warehouse or other data source. In general, as used herein, the term "meta data" refers to data that is not changed by a query or view of the data and is defined by the data source. For example, "meta data" can include business objects such as customers, products, and sales events, or business events (sales orders, purchase orders) or status information (stock values, head counts). Meta data provided by a data source may include information defining the specific characteristics or attributes the meta data item supports.

The meta data of the business information system which will be used to illustrate features of the present invention describes a model of data objects (the "internal data") that includes: InfoProviders, Queries, InfoObjects (typically characteristics or their display attributes or hierarchy node types) and their members, hierarchies, levels, etc. "External data" providers map their internal meta data to the same meta data model without much (or any) loss of information, because the meta data model is very powerful.

"Characteristics" are types of "InfoObjects" that are used to describe the objects dealt with in business processes. A characteristic can be anything from company codes, products, customer groups, fiscal year, period, or region and provide classification possibilities for a dataset. An InfoProvider generally consists of a set of characteristics. The master data (or info object members) includes the permitted members for a characteristic, referred to as a "characteristic member". Characteristic members are discrete objects with a unique name (within the info object). As an illustrative example, the characteristic "region" can have the following members—"north", "south", "central".

The description of a characteristic may include "hierarchies". For example, a characteristic may have a presentation hierarchy assigned to it which is used to structure the members of a characteristic in a hierarchical way. A hierarchy usually has more than one level and the structuring nodes may be info object members of the characteristic itself (bookable nodes), info object members of another info object (to reuse the master data), or may be simple text nodes (special info object in case of BW as a data source). A hierarchy may not be necessarily balanced (where all branches end at the same level) or leveled (where all members on a certain level are derived from the same info object). It is even possible to have no unique nodes that are used multiple times in the hierarchy. Even so, the hierarchy may not be leveled, as the levels may have assigned a language dependent text.

The "nodes" (including the leaves) of a hierarchy are associated with a node type. The node type provides the reference to the info object to which the node belongs and provides means to describe what presentation type that node should be used with and what attributes are needed (e.g., for presentation in a pivot table or in a chart or for formatted reports).

Pursuant to some embodiments, a consumer services layer is provided to provide access to external and internal data in a more client-oriented manner. Embodiments allow client-oriented features such as exception reporting (such as traffic light reporting) and calculations on a display list at the consumer services level. Other features such as currency conversion and special types of hierarchies can be described with embodiments disclosed herein.

FIG. 1 is an information flow diagram illustrating the use of external data (or, as shown, data from third party information providers) in connection with a business information system 100. The system 100 includes a back-end application 120. The back-end application 120 might be designed, for example, to store and process a substantial amount of business information associated with an enterprise.

The back-end application 120 may have access to internal data, or, as shown, business warehouse data 130. The application 120 may also have access to external data, or, as shown, data from one or more information providers 140a, 140n. Pursuant to some embodiments, the back-end application 120 retrieves data from information providers 140a, 140n through the use of consumer services in communication with provider services associated with each of the information providers. These services are not shown in FIG. 1 and will be discussed further below. In general, the services operate to transform data from provider formats into formats usable by the system 100. The back-end application 130 may also be associated with or include an online analytical processing (OLAP) processor (not shown). The OLAP processor may facilitate handling of complex data selection expressions for data retrieval.

The system 100 also includes a front-end application 110 that may be accessed by a user. Note that the front-end application 110 may be remote from the back-end application 120 (e.g., and the two applications 110, 120 may communication communicate via a communication network such as the Internet).

The front-end application 110 might be, for example, a spreadsheet application such as the MICROSOFT® EXCEL® spreadsheet program, or a Web server based application for Web clients or any other technology that needs to access BI data for client like operations. A user may access the front-end application 110 to request particular information, in a particular format, from the back-end application 120. For example, the user might generate a request or "query" asking for weekly inventory information from a number of different regions over the last year. After the data is retrieved by the back-end application 120, it may be formatted as a report and displayed to the user via the front-end application 110.

As one example embodiment, the front-end application 110 is the SAP BI Business Explorer available from SAP AG of Walldorf, Germany. The Business Explorer provides a user interface allowing a user to define and submit desired queries and reports using a Web HTML client or a MICROSOFT® WINDOWS® client.

Figure 2:
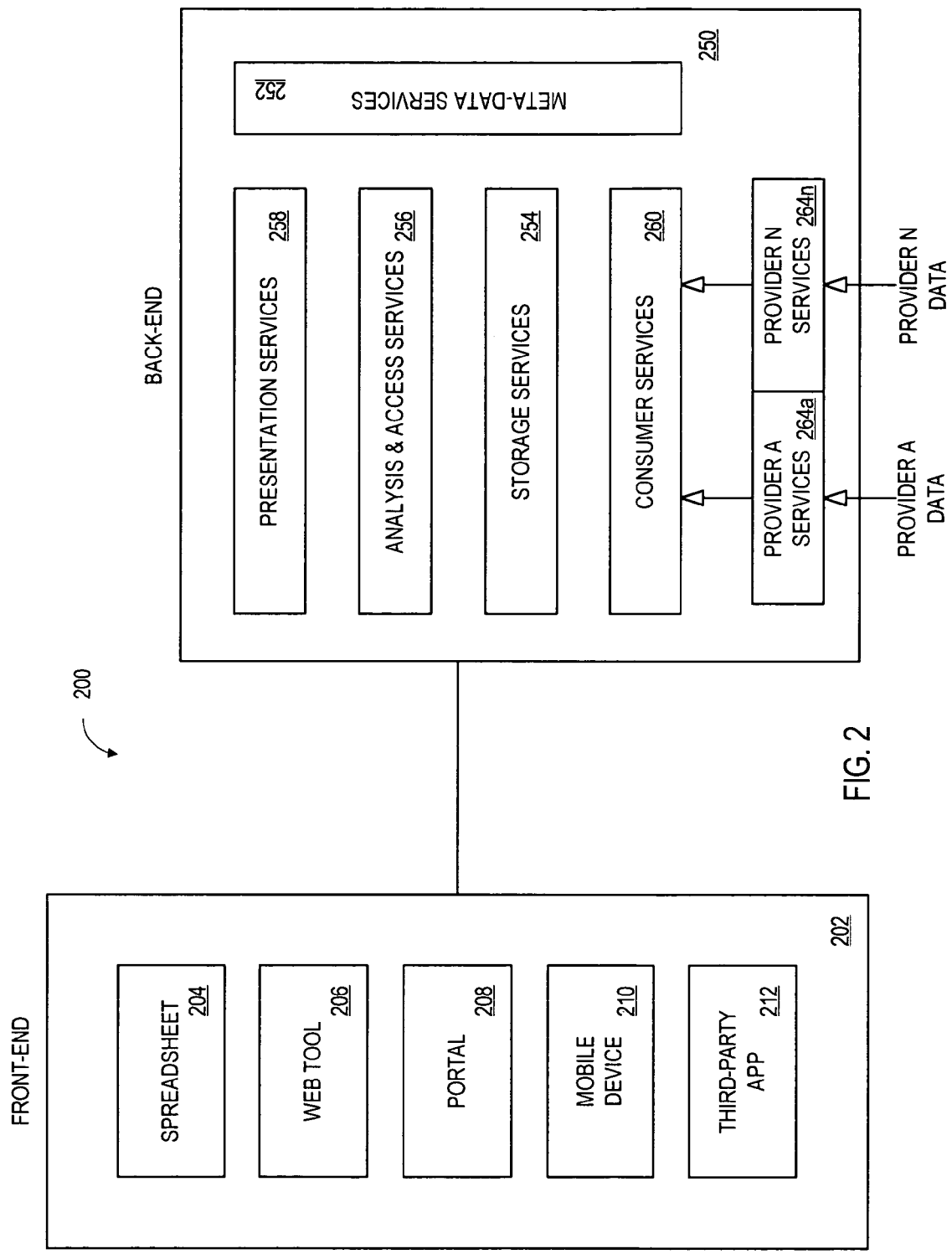
FIG. 2 is a block diagram pursuant to some embodiments.

FIG. 2 is a block diagram of a business information system 200 including a front-end 202 and a back-end 250. The front-end 202 may be used to construct, submit and view query view data obtained through the back-end 250. For example, a user may create and submit a query view through a spreadsheet application 204, or through some other tools associated with the front-end 202. The query view definition or query view state change commands are transmitted to the back-end 250 and is operated on to cause relevant data to be retrieved from information sources, including internal data sources (not shown) and one or more external or provider data sources (shown as information provider A and information provider N). Users may interact with the data via the front-end 202 using a number of different types of applications, including a spreadsheet application 204, a Web tool 206, a portal 208, a mobile device 210, or a third party application 212. The interaction is either communicated via state change commands to the backend 250 or the front-end technology directly calls query view APIs for applying the interaction to the query view.

The system 200 also includes a back-end 250 which may store, access and process business information. The back-end 250 might include, for example, one or more consumer services (e.g., consumer query views) 260 to import business data into the system 200 (e.g., external data from one or more information providers). The consumer services 260 allow the tools from the front-end 202 to work with data from information providers and access the data in a unified way for different information providers or sources of data. As will be discussed further below, the consumer services 260 provide client/application-like access to the provider data. Further, the consumer services 260 provide enhanced services, allowing detailed exception reporting, list calculation, document integration, and other services typically unavailable when retrieving data from external or foreign data sources. The consumer services 260 expose an application programming interface (API) that describes the data in each request and provides easy access to the data in the result set. For example, the consumer services 260 may be implemented as a Java® API, although those skilled in the art will appreciate that other languages or conventions may be used.

The consumer services 260 provide queries to and receive result sets from one or more provider services 264*a*-*n*. Pursuant to some embodiments, each information provider is associated with a provider service 264. Each provider service includes a provider API that a provider has implemented in order to interface with the consumer services 260. Pursuant to some embodiments, the provider services 264 may be implemented as a Java® API, although those skilled in the art will appreciate that other languages or conventions may be used.

The back-end 250 might also include one or more storage services 254 that store and archive business information. For example, the storage services 254 might provide access to different data targets available in the system 200, archive dormant data, and/or manage relational or multi-dimensional databases. One or more analysis and access services 256 might also be provided in the back-end 250. Such a service 256 might, for example, facilitate an analysis of structured and/or unstructured information stored in the system 200 and may include a data-mining engine. In addition, the back-end 250 may include one or more presentation services 258 to provide different ways of presenting information to an end user. According to some embodiments, the presentation service 258 might include a query design engine, a formatting engine, and/or an Extensible Mark-up Language (XML) interface (e.g., to provide data via a Web portal).

According to some embodiments, one or more "meta-data" services 252 are also provided at the back-end 250. In general, as discussed above, "meta-data" may refer to, for example, information about business data that is distributed across a landscape of a system's architectural components (e.g., describing what data resides where). The meta-data service 252 might, for example, store meta-data and handle requests to retrieve, add, change, or delete the meta-data. Furthermore the meta-data service 252 might provide uniform information (that can be customized system wide by the user) on how special values like division by zero or undefined currency/unit aggregation should be prepared for presentation in order to guarantee homogeneous presentation of all sources.

Figure 3:
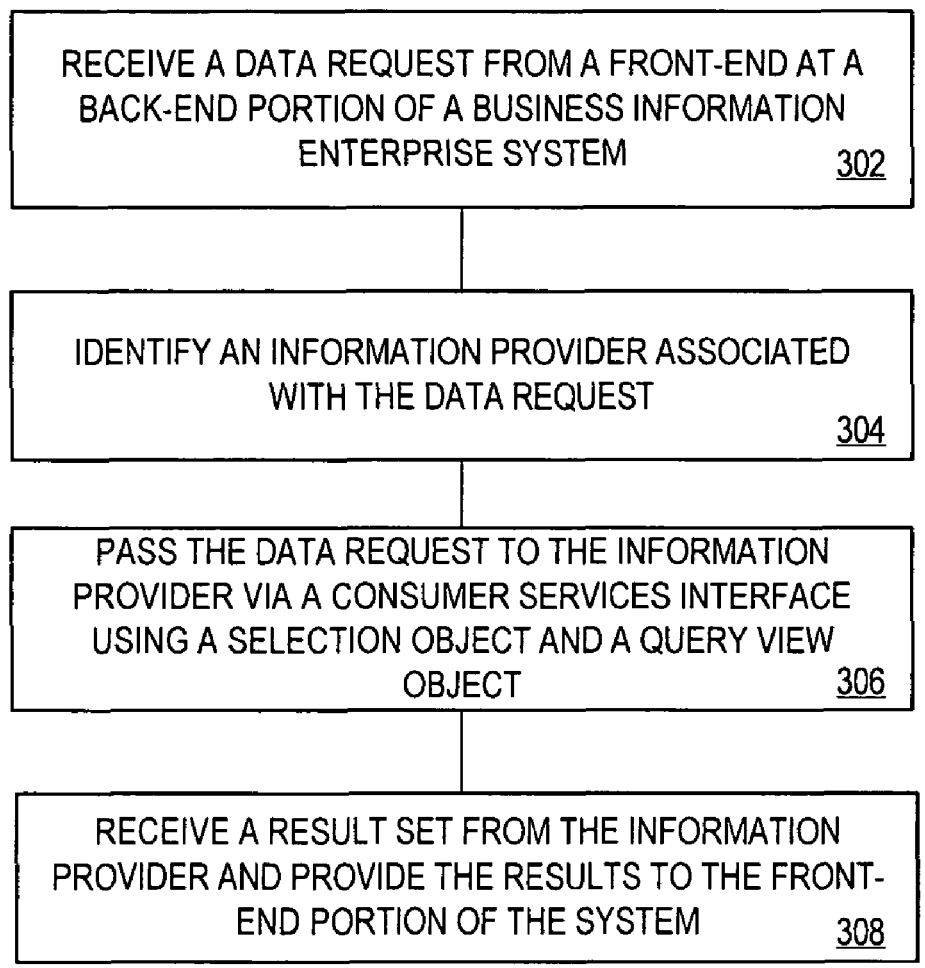
FIG. 3 is a flow diagram pursuant to some embodiments.

FIG. 3 is a flow diagram depicting process steps that may be performed by the business information system of FIGS. 1 and 2. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

The process of FIG. 3 may commence at 302 where a front-end portion of a business information system receives a data request. For example, the data request may be a query view submitted by a user interacting with a user interface. As an illustrative example, if the business information system is one of the systems offered by SAP AG, the user may submit a query view via the SAP BI Business Explorer application. The back-end portion may receive the request from the front-end portion either (a) to conduct, on an OLAP processor, the search defined by the query view, or (b) to execute the query view itself, thereby causing the OLAP processor to conduct the search. The OLAP processor may facilitate handling of complex query view selections for data retrieval that is later enhanced with the client functions of the consumer services.

Processing continues at 304 where the system identifies an information provider associated with the data request. That is, the data request or query view may require the retrieval of data from one or more external information providers. Processing at 304 includes identifying this situation and identifying the relevant information provider. Processing continues at 306 where the system passes the data request to the information provider via a consumer services interface using a selection object and a query view object. The use of these objects will be described further below. In general, however, the selection object and query view object are used to obtain access to the different kinds of data made available by different information providers and to extend the basic selection information with additional data features such as key figures, axes, conditions, and exceptions that are needed for OLAP data access.

Processing continues at 308 where the system receives a result set from the information provider and provides the result set to the front-end portion of the system (e.g., for display to the user). When a provider receives the selection and query view information via its provider API, it performs any OLAP processing needed to generate the result set and passes the result set back to the consumer services interface via the provider API. The consumer services interface then enhances the result set with consumer methods and attributes and performs client functions like list calculation, exception reporting and document integration on top of the provider result set. The enhanced provider result set is then presented to the front-end as a consumer result set for use by the user. Pursuant to some embodiments, the result set is closely linked to the query view and generally cannot be interpreted without the query view. To ensure this linkage is maintained during a query, a state of the query view must be in synch with a state of the result set. If a state change occurs in the query view (e.g., the user attempts to perform some navigation within the results), the result set is automatically invalidated.

Figure 4:
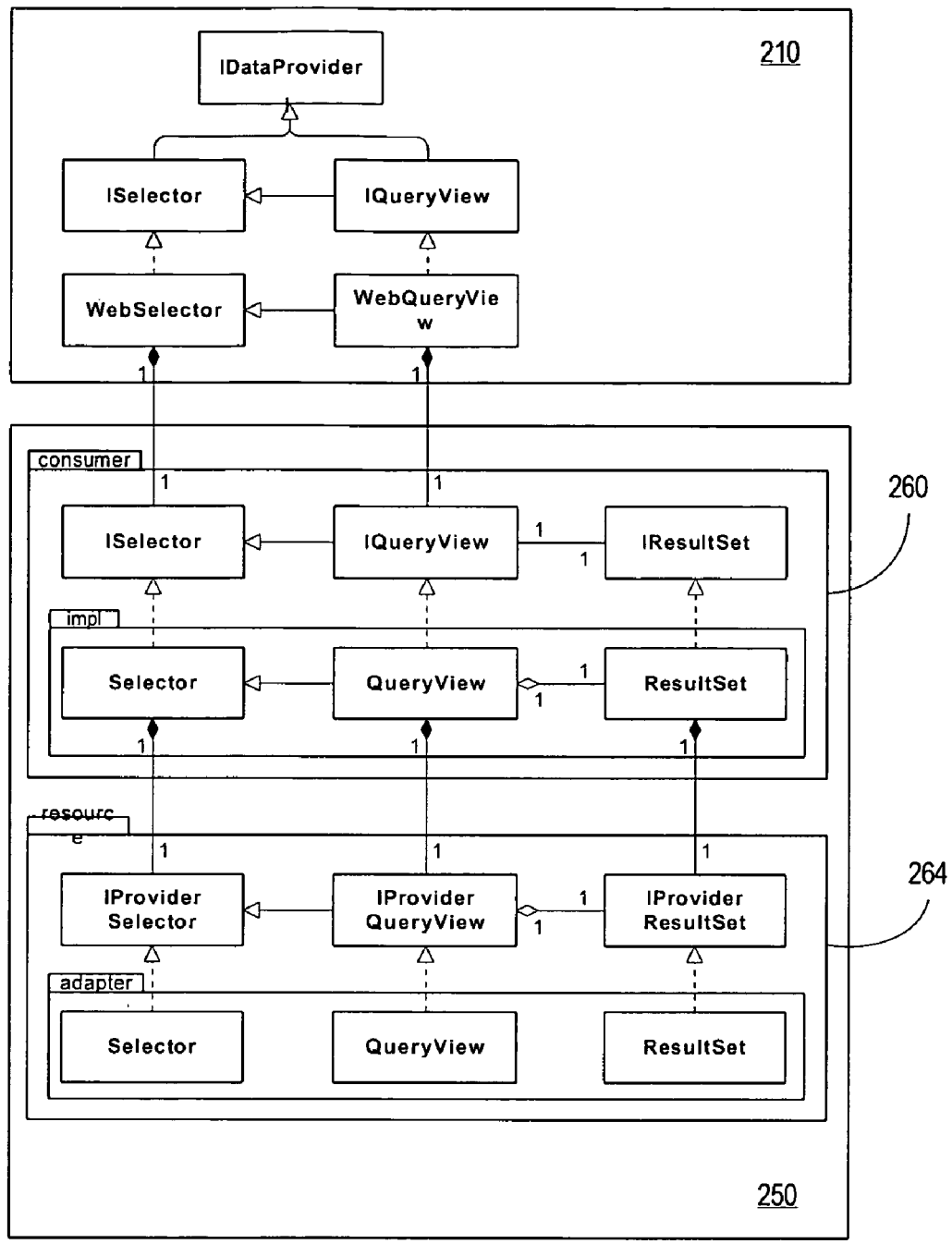
FIG. 4 is an object diagram pursuant to some embodiments.

FIG. 4 is an object diagram depicting objects associated with different components of the business information system 200 including objects associated with the front-end 202 and objects associated with the back-end 250. The objects depicted in FIG. 4 are shown with connectors depicting object relationships. Those skilled in the art will appreciate that the naming conventions and the specific object implementation are for illustrative purposes only and are not intended to be limiting.

The front-end 210 includes objects configured to allow a user to generate a query for submission to the back-end 250. In particular, the front-end 210 includes a selector object and a query view object. Related objects are included in the backend 250 and are used to allow the system to interact with both internal data and external data with a high degree of accuracy and efficiency.

Pursuant to some embodiments, the selection object is configured to provide an ability to work with selections in a multidimensional space of characteristics, and supports features like variables, the intersection of different selections, member access, and document integration. The selection object generally provides the selection space (a restriction to the info provider that is derived from a kind of virtual info provider definition if available and assigned to the selection object; this cannot be changed by the consumer during runtime) and the selection state (the filter the user can change for slicing the data during runtime), along with identification of the characteristic member and attribute access. In some embodiments, the selection object implements the selector APIs and provides a means to describe selections of information provider data. The selection object also provides a means to perform member access for characteristics as well as hierarchies. Further, the object implements variable handling for manipulating characteristic variables that provide flexibility in terms of selection object structure including flexibility in the selection space.

The query view is a natural extension to the selection object and provides access to OLAP data with support for arbitrary list geometries, hierarchy operations, list calculations, and exception reporting. The exception reporting and list calculation service is provided by the consumer services and, as such, does not need to be supported by the provider. Pursuant to some embodiments, exceptions consist of thresholds and cell restrictions. The cell restrictions define the selection context in which a data cell needs to be in to have the alert level triggered. Exception reporting may be defined in a way that the thresholds are evaluated for another data cell than the one the alert level is set for. The alert level event can be forwarded to the axis tuple to which data cell belongs to.

The query view also specifies conditions which may be used to restrict the result set data (e.g., to the top "n" customers according to revenue or revenue>1 million dollars). The consumer API specifies a set of characteristics for a condition at the time the information provider is requested. The user can choose between a special set of characteristics which need to be in the drill down in a sequence, any characteristic in the drill down or only the most detailed characteristic in the drill down dependent on the axis.

The query view specifies list calculation based on the result set returned from the provider. List calculations are calculations that are performed on top of the visible data. There are two groups of list calculations. Firstly the ones that redefine the values of detailed values like ranking (replace the data cell values with their rank to one another), normalization according to a certain group level result, linear regression values, moving average or others. The second group are the operations that redefine result values based on the visible detail values belonging to them. In some embodiments, the available operators are sum, average, variance, deviation, minimum, maximum, counter of values contributing, first, last or others.

The back-end 250 includes consumer services layer 260 having a consumer API and a consumer implementation portion. The implementation portion includes a selector object, a query view object and a result set object (which is returned from an information provider, as discussed below). The consumer API includes the consumer implementation, an "ISelector" object, an "IQueryView" object and an "IResultSet" object. In general, the consumer implementation portion receives the query view's executable code for the provider and wraps it in a logical container for delivery to the information provider via the APIs. The consumer implementation portion also performs operations to enrich the provider data to provide a more useful result set (e.g., such as by providing exception reporting, etc.).

The back-end 250 also includes one or more provider services layers 264 having a provider API and an adapter portion. The adapter portion includes a selector object and a query view object. The adapter portion also includes a result set object which is returned to the consumer implementation via the provider API and the consumer API. The API includes the adapter portion, an "IProvider Selector" object, an "IProvider QueryView" object and an "IProvider ResultSet" object. Each adapter portion is configured to correspond to a particular provider data source.

Different information providers may have different capabilities. These different capabilities may be communicated from each provider implementation to the consumer layer via capabilities that are specified in each provider API. For example, an information provider may specify whether it supports hierarchy drill operations in a way that either the complete result set is recreated or only parts of it need to be replaced. If a result set is completely recreated, then the consumer layer only needs to rebuild the new areas.

Pursuant to some embodiments, to provide flexibility in providing new features, the capabilities of each information provider are retrieved in response to an inquiry from the consumer layer (e.g., the information may be returned by requesting the provider object if it supports a capability (expressed via a constants). In this manner, new capabilities may be rolled out. When a new capability is introduced, not all providers will support it (and do not need to in order to maintain compatibility with the consumer services layer). In this manner, the business information system's capabilities may be extended without having to change all provider implementations at the same time.

Capabilities are also important to the consumer layer. A user who interacts with the consumer layer must be aware of what capabilities are supported by the layer. Pursuant to some embodiments, the consumer layer provides explicit methods for checking the capabilities by simply querying whether a specific capability is supported. For example, a user may query whether a characteristic supports "drilldown" or "aggregation". The consumer layer can be used to automatically enrich capabilities a provider may not support capabilities such as, for example, simple formula calculations. Strong providers may perform the calculations of that capability themselves saving performance or providing more sophisticated features.

Figure 5:
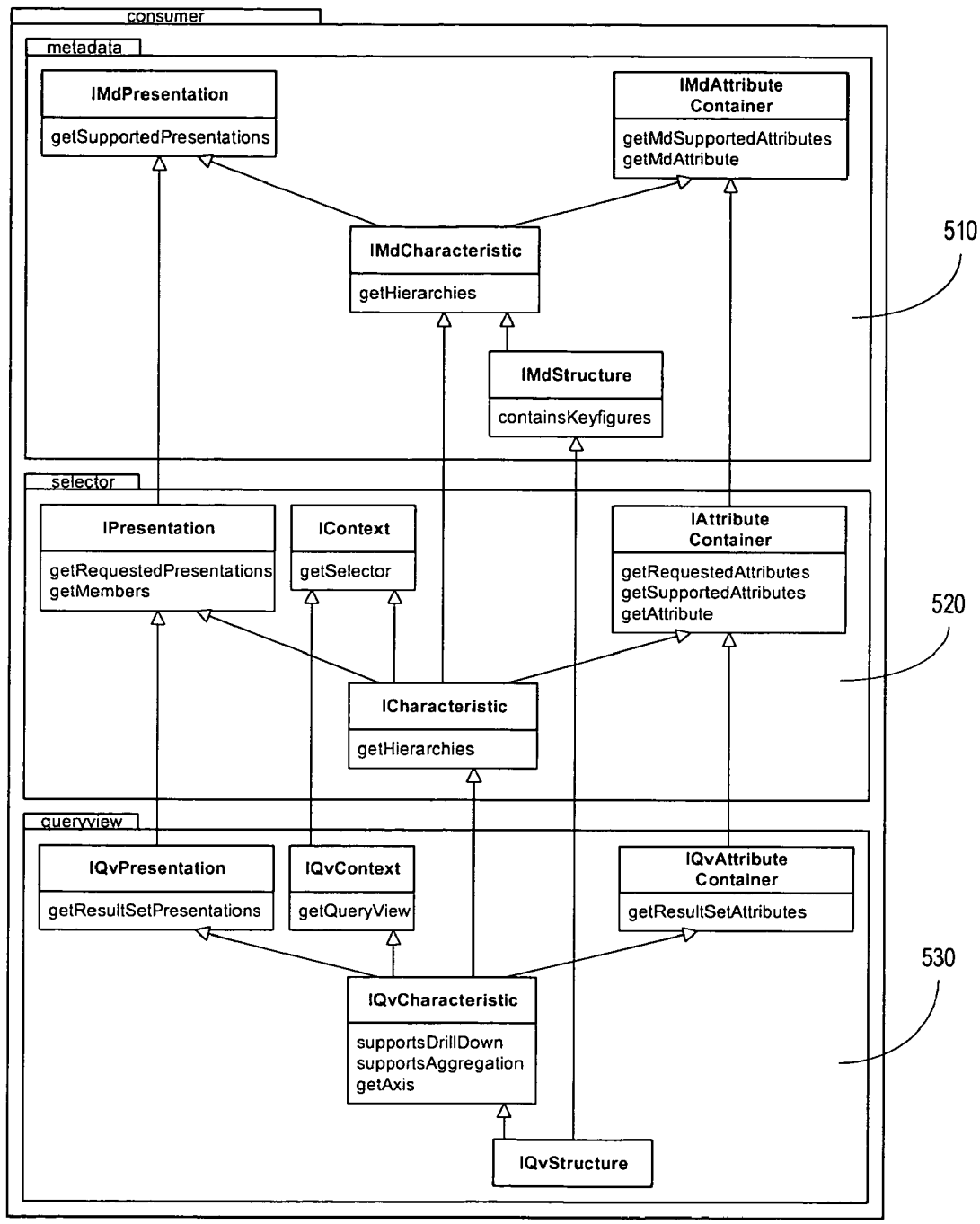
FIG. 5 is a object model inheritance diagram pursuant to some embodiments.

Reference is now made to FIG. 5 where a model inheritance diagram depicting the relationship between the different layers is provided. As shown, the metadata layer 510 includes metadata having properties that are stateless. The selector layer 520 includes selection-related states having member selection properties. The query view layer 530 includes result set-related states, including list geometries and presentations, data cell settings, data driven selections and visualizations (including conditions, exceptions, zero suppression, list calculation, etc.), formulas, and the like.

Because the consumer information is in an object model (e.g., such as a Java® object model), the object model may be restricted to the server that executes it. This could pose difficulties in systems in which multiple servers or clients interact to retrieve and view data. Pursuant to some embodiments, XML is used to serialize data from the object model, allowing the data to be easily transported across different servers and clients. In some embodiments, XML is used to serialize and de-serialize data from the selector and query view objects. The XML corresponds to the object model and, therefore, the data structure is relatively straightforward to learn.

As an example, a first user may wish to share a query view with another user. The first user can do this by simply saving the query view and obtaining the XML serialization. The XML serialization can then be shared with the second user, even if the second user is operating a separate client computer system. The second user can quickly execute the same query view by launching a BI tool and loading the XML file. Pursuant to some embodiments, the serialization can be configured to have only the essential part of the query view needed for the deserialization (e.g., the creation of a query view based on the XML string), or containing meta data (including, for example, the names of the objects as well as the actual text). The later XML can be used for design time tools to obtain access to meta data of the query view. Other features will be apparent to those skilled in the art.

Furthermore, XML serialization of the result set of a query view is supported. Again there are different modes available for providing additional meta data or generation of compact XML. This serialization can be used together with the query view XML serialization to delegate special rendering to other systems like chart or map rendering.

The embodiments described herein are solely for the purpose of illustration. Those skilled in the art will recognize other embodiments may be practiced with modifications and alterations limited only by the claims.

What is claimed is:

1. A method, comprising:
   receiving, from a front-end portion of a business information system, a data request at a back-end portion of the business information system;
   identifying an information provider associated with the data request;
   determining a set of capabilities of the information provider;
   passing the data request to the information provider via a consumer services interface using at least one of a selection object and a query view object;
   determining that the information provider does not support a capability requested by the query view; and
   receiving a result set from the information provider.

2. The method of claim 1, further comprising:
   providing the result set to the front-end portion of the business information system.

3. The method of claim 1, wherein the back-end portion includes at least a first provider services interface in communication with the consumer services interface.

4. The method of claim 1, wherein the selection object allows the specification of multidimensional characteristics selections.

5. The method of claim 4, wherein the selection object further allows the specification of at least one of a characteristic variable, an intersection of different selections, a member access, and a document integration.

6. The method of claim 1, wherein the query view object is configured to provide access to OLAP data of the information provider.

7. The method of claim 6, wherein the query view object is further configured to contain services including at least one of exception reporting, and list calculation.

8. The method of claim 7, wherein:
   the query view object is used to pass the data request to the information provider; and
   the query view object is configured to contain services including list calculation, said list calculation including at least one of ranking, normalization, linear regression values and moving average.

9. The method of claim 1, further comprising:
   determining if variable processing is necessary to respond to the data request and performing said variable processing to refine said request.

10. A medium storing processor-executable process steps, the process steps comprising:
    receiving, from a front-end portion of a business information system, a data request at a back-end portion of the business information system;
    identifying an information provider associated with the data request;
    determining a set of capabilities of the information provider;
    passing the data request to the information provider via a consumer services interface using at least one of a selection object and a query view object;
    determining that the information provider does not support a capability requested by the query view; and
    receiving a result set from the information provider.

11. The medium storing processor-executable process steps of claim 10, the process steps further comprising:
    providing the result set to the front-end portion of the business information system.

12. The medium storing processor-executable process steps of claim 10, wherein the back-end portion includes at least a first provider services interface in communication with the consumer services interface.

13. The medium storing processor-executable process steps of claim 10, wherein the selection object allows the specification of multidimensional characteristics selections.

14. The medium storing processor-executable process steps of claim 13, wherein the selection object further allows the specification of at least one of a characteristic variable, an intersection of different selections, a member access, and a document integration.

15. The medium storing processor-executable process steps of claim 10, wherein the query view object is configured to provide access to OLAP data of the information provider.

16. The medium storing processor-executable process steps of claim 15, wherein the query view object is further configured to contain a consumer service including at least one of exception reporting, a list calculation, and an access to unstructured information.

17. The medium storing processor-executable process steps of claim 16, wherein:
    the query view object is used to pass the data request to the information provider; and
    the query view object is configured to contain a consumer service including a list calculation, said list calculation including at least one of ranking, normalization, linear regression values and moving average.

18. The medium storing processor-executable process steps of claim 10, the process steps further comprising:
    determining if variable processing is necessary to respond to the data request and performing said variable processing to refine said request.

* * * * *